(12) United States Patent
Kim (10) Patent No.: US 12,011,993 B2
(45) Date of Patent: Jun. 18, 2024

(54) POWER TRANSMISSION DEVICE FOR COMMERCIAL VEHICLE HAVING ELECTRIC AXLE

(71) Applicants: Hyundai Motor Company, Seoul (KR); Kia Corporation, Seoul (KR)

(72) Inventor: Ju San Kim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/241,412

(22) Filed: Sep. 1, 2023

(65) Prior Publication Data

US 2023/0406094 A1    Dec. 21, 2023

Related U.S. Application Data

(62) Division of application No. 17/490,537, filed on Sep. 30, 2021, now Pat. No. 11,794,573.

(30) Foreign Application Priority Data

Apr. 13, 2021    (KR) .................. 10-2021-0047595

(51) Int. Cl.
*B60K 17/04*    (2006.01)
*B60K 1/00*    (2006.01)
(Continued)

(52) U.S. Cl.
CPC .............. *B60K 17/046* (2013.01); *B60K 1/02* (2013.01); *B60K 17/16* (2013.01); *B60K 17/356* (2013.01);
(Continued)

(58) Field of Classification Search
CPC .... B60K 17/046; B60K 17/16; B60K 17/356; B60K 1/02; B60K 2001/001; B60K 17/346; B60K 17/348; B60K 2001/0438; B60K 2007/0038; B60K 2007/0046; B60K 2007/0061; B60K 2007/0092; B60K 7/0007; B60K 1/04; B60K 17/354; B60K 17/36; B60K 1/00; B60K 17/04; B60K 17/043; B60K 17/22; B60K 17/02; B60K 17/08; B60L 50/75; F16H 37/08;
(Continued)

(56) References Cited

U.S. PATENT DOCUMENTS 8,478,496 B2    7/2013    Honzek
2005/0205329 A1    9/2005    Fanger-Vexler
(Continued)

FOREIGN PATENT DOCUMENTS

WO    WO 0160649 A1    8/2001

*Primary Examiner* — Tinh Dang
(74) *Attorney, Agent, or Firm* — MORGAN, LEWIS & BOCKIUS LLP (57) ABSTRACT

A power transmission device for a commercial vehicle having an electric axle, may include a first differential ring gear fixedly mounted on a first rear-wheel driveshaft; a second differential ring gear mounted on a second rear-wheel driveshaft; a propeller shaft, with a first differential drive gear engaged with the first differential ring gear being connected to a front-end portion of the propeller shaft and a second differential drive gear engaged with the second differential ring gear being connected to a rear end portion thereof; a reducer connected to the first differential ring gear or the propeller shaft; and a motor, an output shaft of the motor being connected to an input gear of the reducer.

2 Claims, 9 Drawing Sheets

(51) Int. Cl.
| | |
|---|---|
| *B60K 1/02* | (2006.01) |
| *B60K 7/00* | (2006.01) |
| *B60K 17/16* | (2006.01) |
| *B60K 17/356* | (2006.01) |
| *B60L 50/75* | (2019.01) |
| B60K 17/346 | (2006.01) |
| B60K 17/348 | (2006.01) |
| F16H 37/08 | (2006.01) |
| F16H 48/05 | (2012.01) |

(52) U.S. Cl.
CPC ........ *B60L 50/75* (2019.02); *B60K 2001/001* (2013.01); *B60K 17/346* (2013.01); *B60K 17/348* (2013.01); *F16H 37/08* (2013.01); *F16H 37/082* (2013.01); *F16H 48/05* (2013.01)

(58) Field of Classification Search
CPC ........ F16H 37/082; F16H 48/05; F16H 48/06; F16H 1/00–48; F16H 1/32; F16H 3/727; F16H 57/023; F16H 2001/327; F16H 2200/2005; B60Y 2200/14; B60Y 2400/202
See application file for complete search history.

(56) References Cited

U.S. PATENT DOCUMENTS

| | | |
|---|---|---|
| 2011/0024222 A1 | 2/2011 | Honzek |
| 2015/0258899 A1 | 9/2015 | Anvari |

⎯→ : POWER TRANSMISSION PATH

→ : POWER TRANSMISSION PATH

→ : POWER TRANSMISSION PATH

POWER TRANSMISSION DEVICE FOR COMMERCIAL VEHICLE HAVING ELECTRIC AXLE

CROSS REFERENCE TO RELATED APPLICATION

The present application is a Divisional of U.S. patent application Ser. No. 17/490,537, filed Sep. 30, 2021, which claims priority to Korean Patent Application No. 10-2021-0047595, filed Apr. 13, 2021, the entire contents of which is incorporated herein for all purposes by this reference.

BACKGROUND OF THE INVENTION

Field of the Invention

The present invention relates to a power transmission device for a commercial vehicle having an electric axle, and more particularly, to a power transmission device for a commercial vehicle having an electric axle with a novel structure where a first rear-wheel driveshaft driven by a motor is connected to a second rear-wheel driveshaft in a power-transferable manner with a propeller shaft in between.

Description of Related Art

Environment-friendly passenger vehicles, such as electric vehicles and hydrogen fuel cell vehicles, have been released on the market. Environment-friendly commercial vehicles provided with an electric-axle assembly, such as battery electric trucks or hydrogen fuel cell trucks, have also been under development.

Usually, a truck provided with a single driveshaft as a rear-wheel driveshaft has for example a 4×2 or 6×2 array of wheels that indicates the total number of wheels×the number of drive wheels connected to the single driveshaft. In contrast, a truck provided with a multi-driveshaft including a first rear-wheel driveshaft and a second rear-wheel driveshaft has for example a 6×4, 8×4, or 10×4 array of wheels that indicates the total number of wheels×the number of drive wheels connected to the first driveshaft and the second driveshaft.

Figure 1:
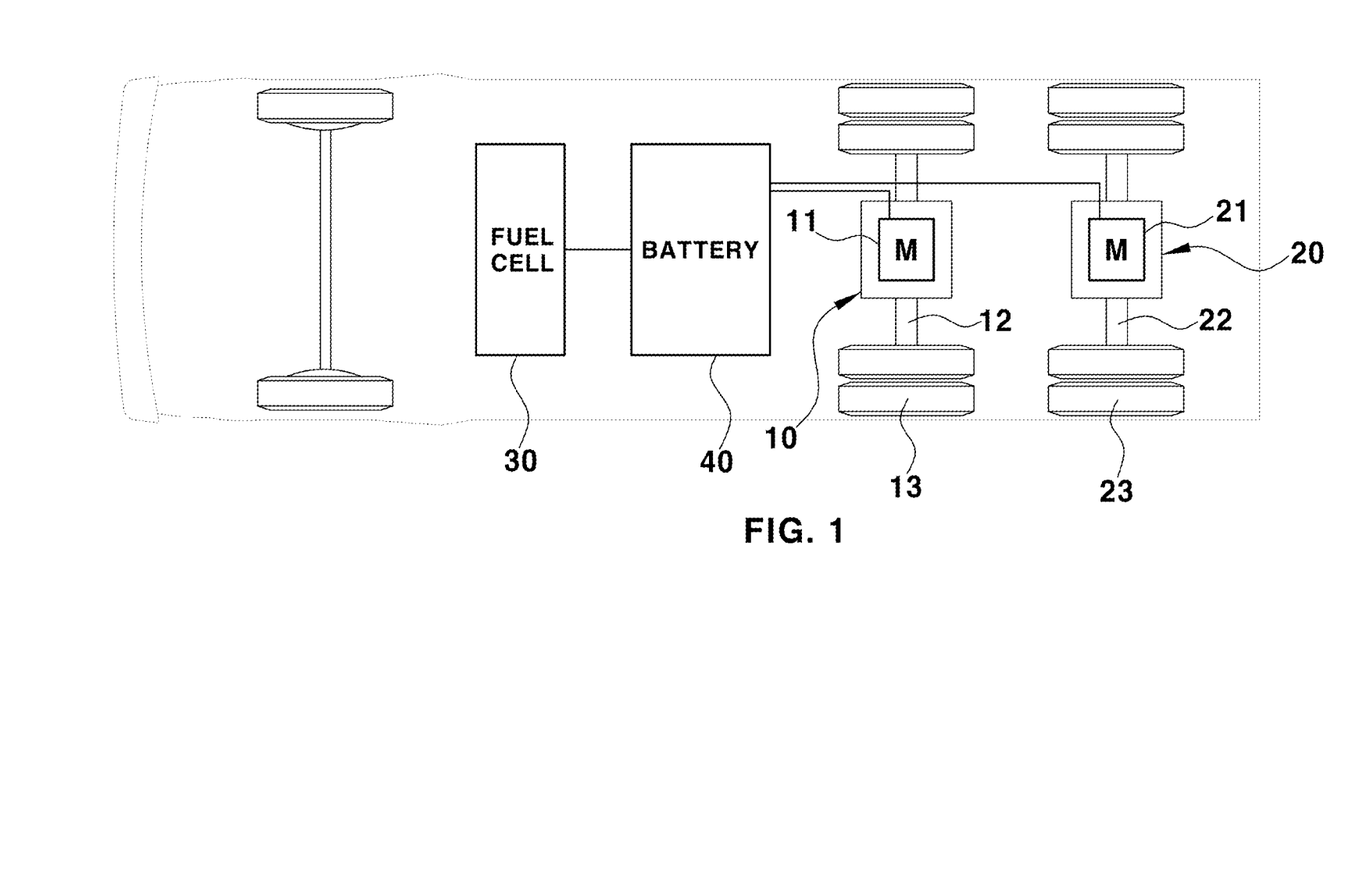
FIG. 1 is a schematic view exemplarily illustrating an example of a power train of a hydrogen fuel cell truck among commercial vehicles having an electric axle.

FIG. 1 is a schematic view exemplarily illustrating an example of a power train of a hydrogen fuel cell truck among commercial vehicles having an electric axle.

As illustrated in FIG. 1, the hydrogen fuel cell truck among the commercial vehicles having the electric axle includes a fuel cell 30 generating electrical energy and a battery 40 charged with the electrical energy generated by the fuel cell 30.

Furthermore, the hydrogen fuel cell truck includes a first rear-wheel driveshaft 12 and a second rear-wheel driveshaft 22, as the multi-driveshaft, and has a 6×4 array of wheels.

To the present end, the hydrogen fuel cell truck has a structure where in addition to front wheels arranged in the front side thereof, a pair of rear wheels as drive wheels is arranged in the rear side thereof. A first electric axle 10 outputting power to the first driveshaft 12 is mounted on a front rear-wheel in the pair of rear wheels, and a second electric axle 20 outputting power to the second driveshaft 22 is mounted on a rear rear-wheel in the pair of rear wheels.

The first rear wheel electric axle 10 may include an axle housing, a first motor 11, a first driveshaft 12, a first wheels 13, and the like. The first motor 11 is mounted within the axle housing and is driven with the electrical energy of the fuel cell 30 or the battery 40. The first driveshaft 12 is connected to an output shaft of the first motor 11. The first wheel 13 is mounted on both end portions of the first driveshaft 12.

The second rear wheel electric axle 20 may also be include an axle housing, a second motor 21, a second driveshaft 22, a second wheel 23, and the like. The second motor 21 is mounted within the axle housing and is driven with the electrical energy of the fuel cell 30 or the battery 40. The second driveshaft 22 is connected to an output shaft of the second motor 21. The second wheel 23 is mounted on both end portions of the second shaft 22.

At the present point, a reducer or a transmission may be connected to the output shafts of the first motor 11 and the second motor 21.

Figure 2A:
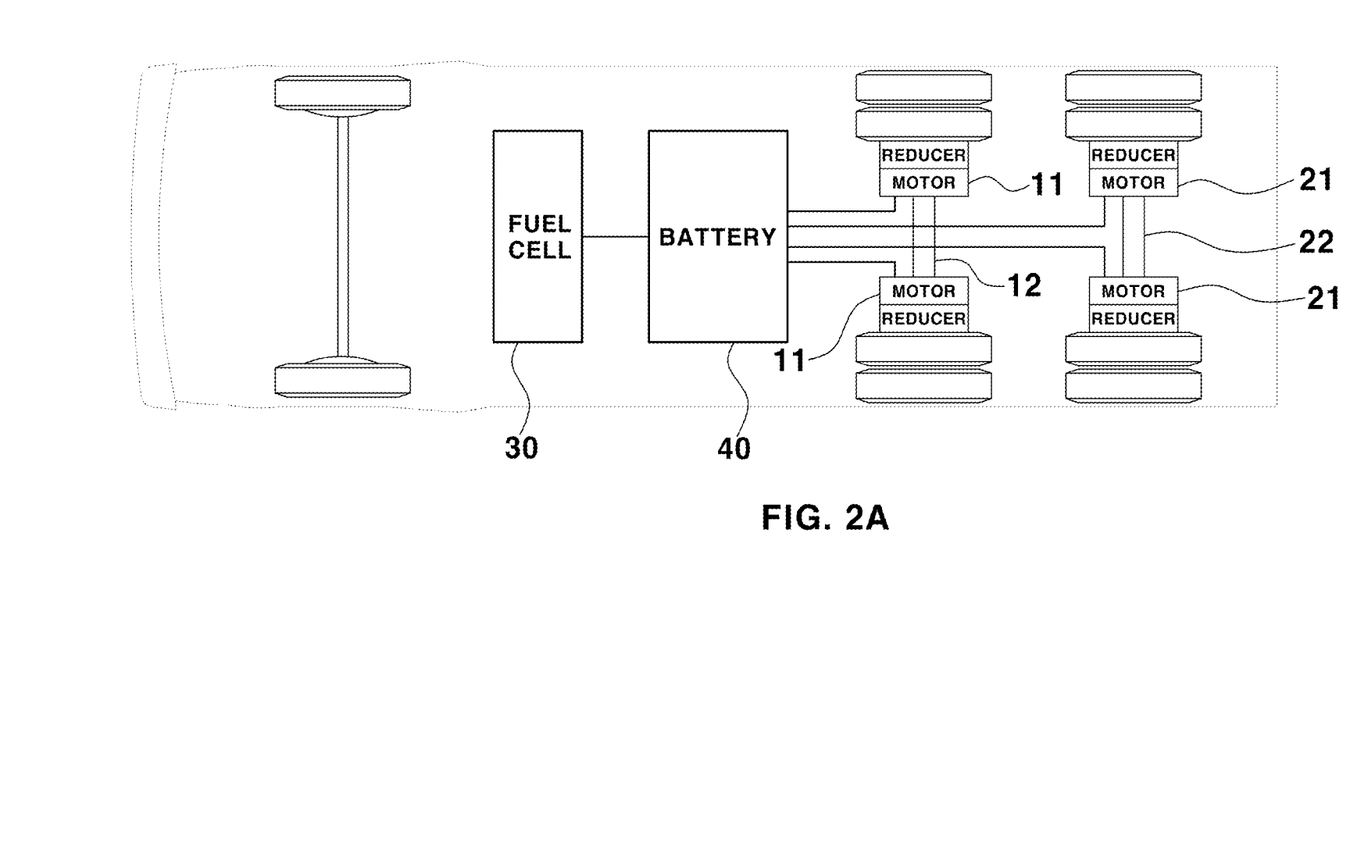
FIG. 2A and FIG. 2B are schematic views each illustrating an example where a motor and a reducer, which are included in an electric axle of the hydrogen fuel cell truck among the commercial vehicles, are disposed.
Figure 2B:
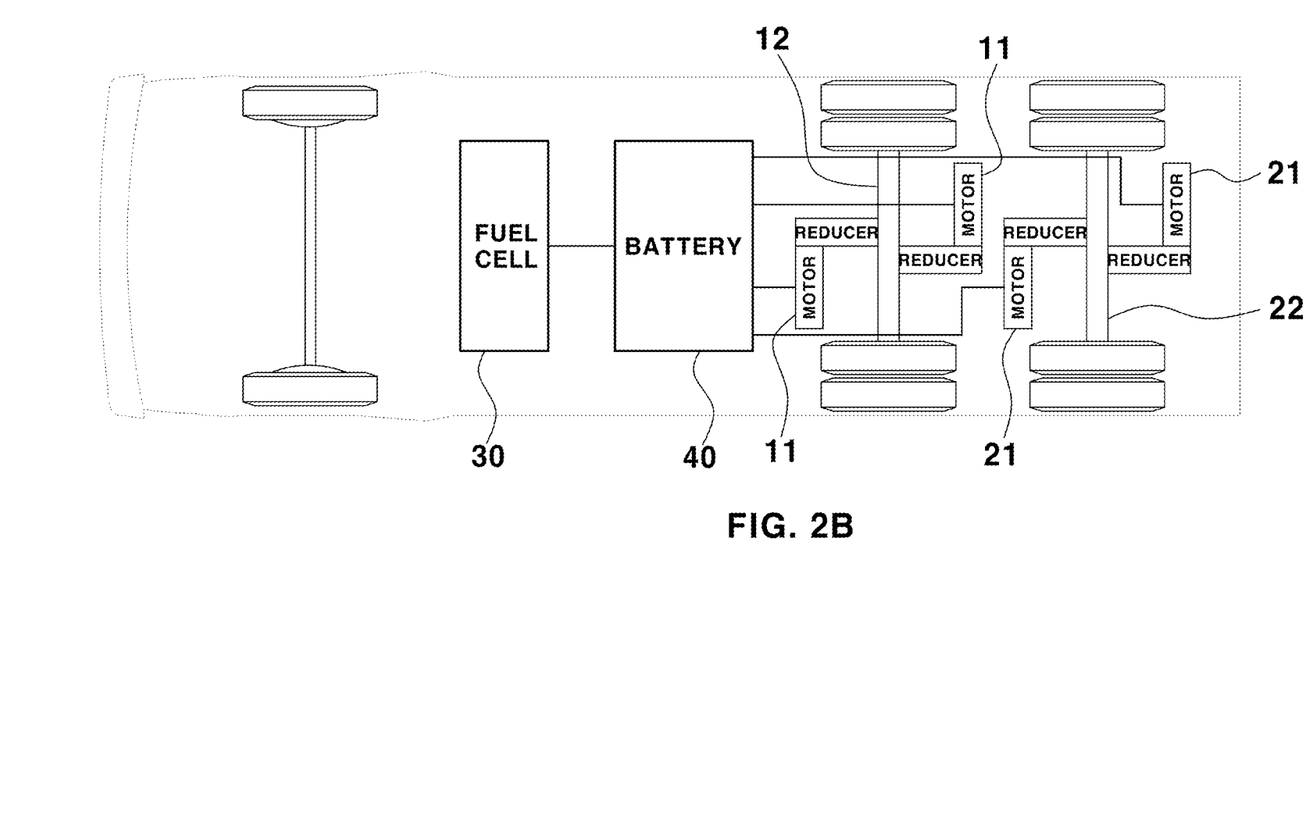

For example, in the case of the commercial vehicle having the first and second electric axles, as illustrated in FIG. 2A and FIG. 2B, two or more first motors 11 and the reducer may be connected to the first driveshaft 12, and two or more second motors 21 and the reducer may also be connected to the second rear-wheel driveshaft 22.

Figure 2C:
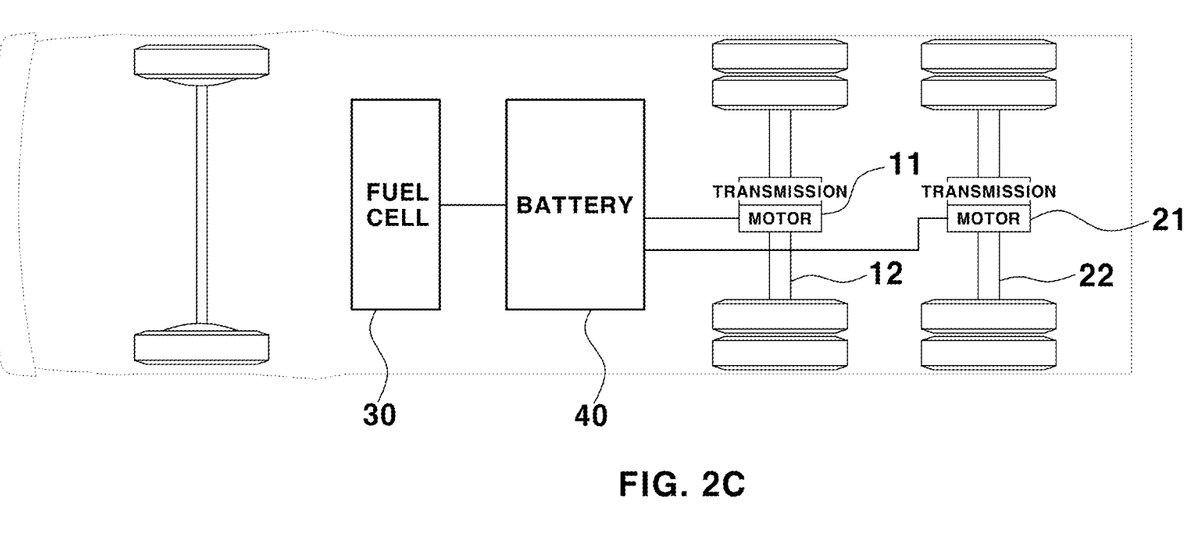
FIG. 2C and FIG. 2D are schematic views each illustrating an example where the motor and a transmission, which are included in the electric axle of the hydrogen fuel cell truck among the commercial vehicles, are disposed.
Figure 2D:
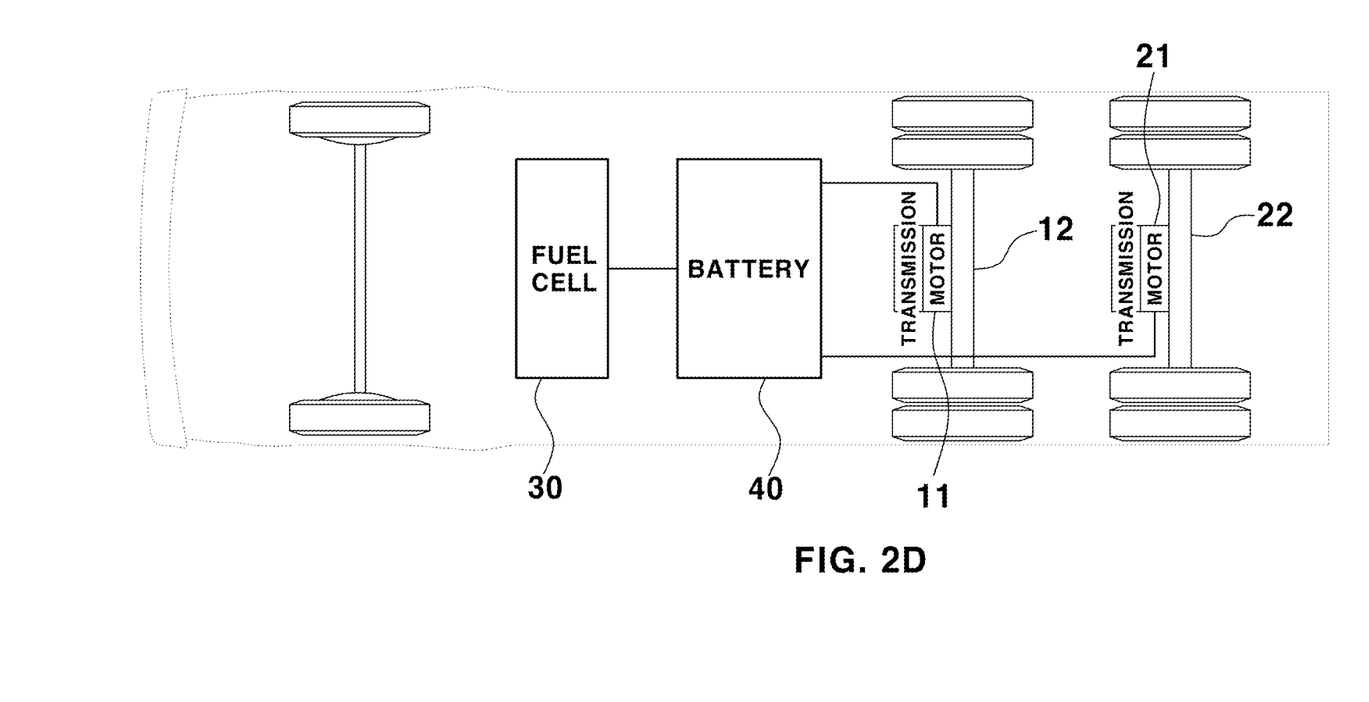

Furthermore, in the case of the commercial vehicle having the first and second electric axles, as illustrated in FIGS. 2C and 2D, the first motor 11 and the transmission may be connected to the first rear-wheel driveshaft 12, and the second motor 21 and the transmission may also be connected to the second rear-wheel driveshaft 22.

In the present manner, in the case of the commercial vehicle provided with the multi-driveshaft including the first driveshaft 12 connected to the first motor 11 of the first electric axle 10, the second driveshaft 22 connected to the second motor 12 of the second electric axle 20, and the like, drive torque of the first motor 11 may be output to the first driveshaft 12, and at the same time, drive torque of the second motor 21 may be output to the second driveshaft. Therefore, driver's required torque may be easily satisfied.

However, in the case of the commercial vehicle having the single driveshaft, only drive torque of a single motor is output to the single driveshaft. Therefore, to satisfy the driver's required torque, specifications for a high-performance model of a single motor configured for producing a higher output than the first motor 11 and the second motor 21 need to be employed.

Accordingly, an electric axle assembly finding application in the multi-driveshaft and an electric axle assembly finding application in the single driveshaft are required to have different specifications. The present requirement increases development and manufacturing costs.

Furthermore, in the case of the commercial vehicle having the multi-driveshaft, the reducer or the transmission, as well as the first motor 11, is disposed in the first electric axle 10. The reducer or the transmission, as well as the second motor 21, is also included in the second electric axle 20. A packaging space is difficult to secure for assembling a large number of these components. The present difficulty decreases the convenience of assembling and servicing.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a power transmission device configured for a commercial vehicle having an electric axle with a structure in which a first rear-wheel driveshaft driven by a motor is connected to a second rear-wheel driveshaft in a power-transferable manner with a propeller shaft in between. The electric axle is configured for driving a multi-driveshaft, including the first driveshaft and the second driveshaft, with one motor, and is sharable for the multi-driveshaft and a single driveshaft, depending on whether or not the propeller shaft connects the first driveshaft and the second driveshaft to each other.

According to various aspects of the present invention, there is provided a power transmission device configured for a commercial vehicle having an electric axle, the power transmission device including: a first differential ring gear fixedly mounted on a first rear-wheel driveshaft; a second differential ring gear mounted on a second rear-wheel driveshaft; a propeller shaft, with a first differential drive gear engaged with the first differential ring gear being connected to a front-end portion of the propeller shaft and a second differential drive gear engaged with the second differential ring gear being connected to a rear end portion thereof; a reducer connected to the first differential ring gear or the propeller shaft; and a motor, with an output shaft of the motor being connected to an input gear of the reducer.

In the power transmission device, in a case where the motor and the reducer are disposed in a direction parallel with the first rear-wheel driveshaft, the reducer may include: a sun gear which is the input gear of the reducer and fixedly connected to the output shaft of the motor; a pinion gear-engaged with the sun gear; a ring gear fixedly connected to a housing of the reducer and gear-engaged with the pinion; a planet carrier connected coaxially to the pinion; and a first final output shaft connecting the planet carrier to the first differential ring gear.

In the power transmission device, in a case where the output shaft of the motor and an rotation axis of the reducer are disposed perpendicular to the first rear-wheel driveshaft, a power distribution gear may be mounted on the propeller shaft, and a final output gear connected to an output shaft of the reducer may be engaged with the power distribution gear.

In the power transmission device, in the case where the motor and the reducer are disposed in the direction perpendicular to the first rear-wheel driveshaft, the reducer may include: a sun gear which is an input gear connected to the output shaft of the motor; a pinion gear-engaged with the sun gear; a ring gear fixedly connected to a housing of the reducer and gear-engaged with the pinion; a planet carrier connected coaxially to the pinion; and a second final output shaft connecting the planet carrier to the final output gear.

In the power transmission device, the first differential ring gear and the second differential ring gear may be disposed in opposite directions with respect to the propeller shaft.

In the power transmission device, with respective universal joints, the front-end portion of the propeller shaft and the first differential drive gear may be connected to each other, and the rear end portion of the propeller shaft and the second differential drive gear may be connected to each other.

According to various aspects of the present invention, there is provided a power transmission device configured for a commercial vehicle having an electric axle, the power transmission device include: a first differential ring gear fixedly mounted on a first rear-wheel driveshaft; a second differential ring gear mounted on a second rear-wheel driveshaft; a propeller shaft, with a first differential drive gear engaged with the first differential ring gear being connected to a front-end portion of the propeller shaft and a second differential drive gear engaged with the second differential ring gear being connected to a rear end portion thereof, a power distribution gear fixedly mounted on the propeller shaft; a transmission having a final output gear engaged with the power distribution gear; and a first motor and a second motor that are connected to an input side of the transmission and thus selectively output power.

In the power transmission device, the transmission may include a first speed-change gear and a second speed-change gear that are rotatably mounted on an output shaft of the first motor; a first clutch disposed between the first speed-change gear and the second speed-change gear and configured for connecting the first speed-change gear to the output shaft of the first motor or connecting the second speed-change gear to the output shaft of the first motor; a power transmission shaft fixedly connected to the final output gear; a first intermediate gear fixedly mounted on the power transmission shaft and engaged with the first speed-change gear; and a second intermediate gear fixedly mounted on the power transmission shaft and engaged with the second speed-change gear.

In the power transmission device, the transmission may further include: a third speed-change gear and a fourth speed-change gear that are rotatably mounted on an output shaft of the second motor; a second clutch mounted between the third speed-change gear and the fourth speed-change gear and configured for connecting the third speed-change gear with the output shaft of the second motor or connecting the fourth speed-change gear to the output shaft of the second motor; and a third intermediate gear fixedly mounted on the power transmission shaft and engaged with the third speed-change gear, wherein the fourth speed-change gear may be engaged directly with the final output gear.

In the power transmission device, the first differential ring gear and the second differential ring gear may be disposed in opposite directions with respect to the propeller shaft.

In the power transmission device, with respective universal joints, the front-end portion of the propeller shaft and the first differential drive gear may be connected to each other, and the rear end portion of the propeller shaft and the second differential drive gear may be connected to each other.

The power transmission device configured for the commercial vehicle having the electric axle according to various exemplary embodiments of the present invention are directed to providing the following advantages.

The motor, the reducer, and the like are connected to both the first rear-wheel driveshaft and the second rear-wheel driveshaft. Firstly, unlike in the instant case, the motor and the reducer (or the transmission) are connected to only the first rear-wheel driveshaft, and power of the first rear-wheel driveshaft is transferred to the second rear-wheel driveshaft through the propeller shaft. Thus, the multi-driveshaft including the first driveshaft and the second driveshaft may be easily driven with one motor. Furthermore, the number of components including the motor, the reducer (or the transmission), and the like that are connected to the second rear-wheel driveshaft may be reduced. The reduction in the number of components cannot only be advantageous in securing a packaging space, but also can improve the convenience of assembling and servicing.

Secondly, when only the propeller shaft connecting the first rear-wheel driveshaft and the second rear-wheel driveshaft to each other is removed, the first rear-wheel driveshaft to which the motor power is applied becomes a single driveshaft. Therefore, the electric-type axle may be provided which is sharable for the multi-driveshaft and the single driveshaft, depending on whether or not the propeller shaft connects the first rear-wheel driveshaft and the second rear-wheel driveshaft to each other.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a plane view exemplarily illustrating a power transmission device for a commercial vehicle according to various exemplary embodiments of the present invention as simplified by excluding a motor, a reducer, and the like;

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will be described in detail below with reference to the accompanying drawings.

Figure 3A:
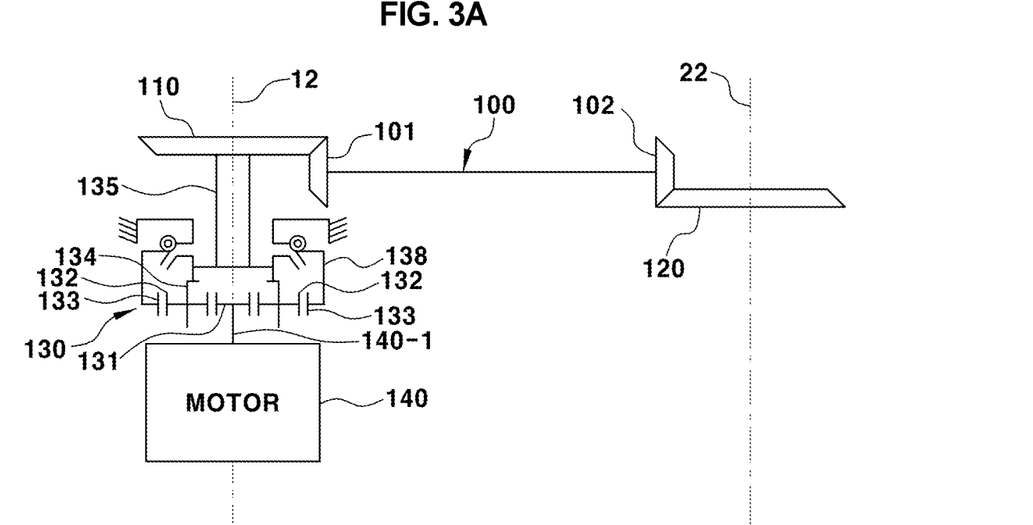
FIG. 3A is a power train view exemplarily illustrating a power transmission device for a commercial vehicle having an electric axle according to various exemplary embodiments of the present invention.
Figure 3B:
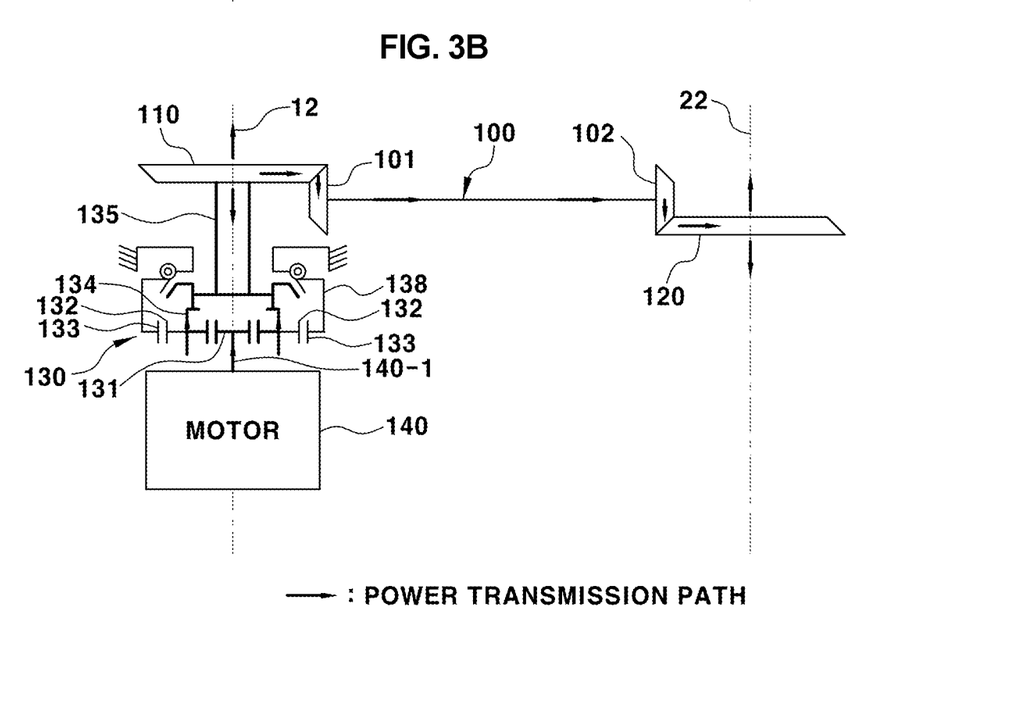
FIG. 3B is a power train view exemplarily illustrating a power transmission path of the power transmission device for the commercial vehicle having the electric axle according to the various exemplary embodiments of the present invention.

FIG. 3A is a power train view exemplarily illustrating a power transmission device for a commercial vehicle having an electric axle according to various exemplary embodiments of the present invention. FIG. 3B is a power train view exemplarily illustrating a power transmission path of the power transmission device for the commercial vehicle having the electric axle according to the various exemplary embodiments of the present invention.

According to the various exemplary embodiments of the present invention, as illustrated in FIG. 3A and FIG. 3B, a first differential ring gear 110 is mounted in a simultaneously rotatable manner on a first rear-wheel driveshaft 12 of the commercial vehicle, such as a hydrogen fuel cell truck, and a second differential ring gear 120 is mounted in a simultaneously rotatable manner on a second rear-wheel driveshaft 22 thereof. Furthermore, the first differential ring gear 110 and the second differential ring gear 120 are connected in a power-transferable manner to each other with a propeller shaft 100.

To the present end, a first differential drive gear 101 engaged with the first differential ring gear 110 is connected to a front-end portion of the propeller shaft 100, and a second differential drive gear 102 engaged with the second differential ring gear 120 is connected to a rear end portion thereof.

Thus, rotational power of the first rear-wheel driveshaft 12 may be transferred to the propeller shaft 100 through the first differential ring gear 110 and the first differential drive gear 101, and then may be transferred to the second rear-wheel driveshaft 22 through the second differential drive gear 102 and the second differential ring gear 120.

According to the various exemplary embodiments of the present invention, a motor 140 and a reducer 130 are disposed in a direction parallel with the first rear-wheel driveshaft 12.

That is, in a state where the motor 140 and the reducer 130 are disposed in the direction parallel with the first rear-wheel driveshaft 12, the reducer 130 reducing and outputting motor power is connected to the first differential ring gear 110, and an output shaft 140-1 of the motor 140 is connected to an input gear of the reducer 130.

The motor 140 and the reducer 130 are disposed in the direction parallel with the first rear-wheel driveshaft 12, and thus, the reducer 130 according to the various exemplary embodiments of the present invention may include a sun gear 131, a plurality of pinions 132, a ring gear 133, a planet carrier 134, and a first final output shaft 135. The sun gear 131 is an input gear connected to the output shaft 140-1 of the motor 140. The plurality of pinions 132 are engaged with the sun gear 131. The ring gear 133 is formed within a reducer housing 138 and is engaged with the pinion 132. The planet carrier 134 is connected coaxially to the pinion 132. The first final output shaft 135 is connected in a power-transferable manner between the planet carrier 134 and the first differential ring gear 110.

Therefore, as illustrated in FIG. 3B, when the motor 140 is driven, an operation in which the sun gear 131 connected to the output shaft 140-1 of the motor 140 rotates, an operation in which the pinion 132 moves, while rotating, along an external circumferential surface of the sun gear 131 and an internal circumferential surface of the ring gear 133, an operation in which the planet carrier 134 connected coaxially to the pinion 132 rotates, and an operation in which the first final output shaft 135 connected to the planet carrier 134 rotates are performed. Subsequently, rotational power of the first final output shaft 135 is transferred to the first differential ring gear 110, and at the same time, is transferred to the first rear-wheel driveshaft 12 on which the first differential ring gear 110 is mounted. Thus, the first rear-wheel driveshaft 12 and front rear-wheels connected thereto rotate for traveling. Herein, the first final output shaft 135 is hollow so that the first rear-wheel driveshaft 12 passes through the first final output shaft 135, thereby transferring the rotational power to the wheels. The output shaft 140-1 of the motor 140 and the first rear-wheel driveshaft 12 are connected to each other. At this time, the planet carrier 134, the first rear-wheel driveshaft 12 and the first final output shaft 135 are coaxial, but the pinion 132 and the output shaft 140-1 of the motor 140 are not coaxial.

Along with this, as illustrated in FIG. 3B, when rotational power of the first differential ring gear 110 is transferred to the second differential ring gear 120 through the first differential drive gear 101, the propeller shaft 100, and the second differential drive gear 102, the second rear-wheel driveshaft 22 on which the second differential ring gear 120 is mounted and rear rear-wheels connected thereto rotate for traveling.

Figure 5:
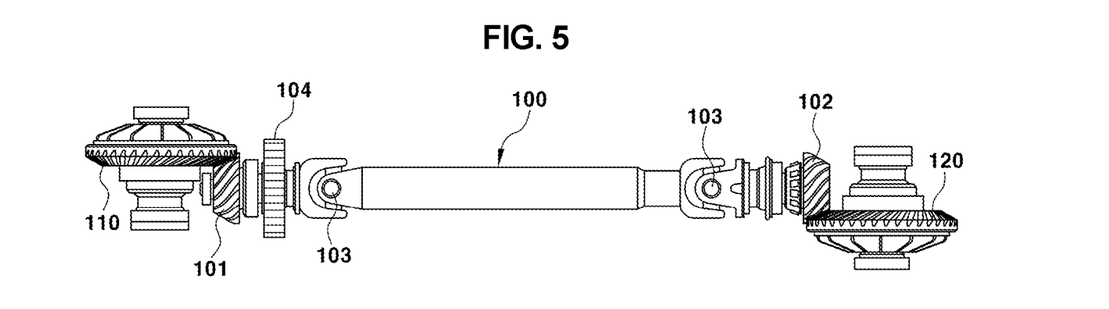

At the present point, the first differential ring gear 110 and the second differential ring gear 120, as illustrated in FIG. 5, are disposed in opposite directions such that the first rear-wheel driveshaft 12 and the second rear-wheel driveshaft 22 rotate in the same direction for traveling.

For example, the first differential ring gear 110 is disposed to face leftward in the direction of the width of a vehicle body, and the second differential ring gear 120 is disposed to face rightward in the direction of the width thereof. Thus, the first rear-wheel driveshaft 12 and the second rear-wheel driveshaft 22 can rotate in the same direction for traveling.

The front-end portion of the propeller shaft 100 and the first differential drive gear 101 are connected to each other with a universal joint 103, and a rear end portion of the propeller shaft 100 and the second differential drive gear 102 are also connected to each other with another universal joint 103, such that, when the propeller shaft 100 rotates, vibration, noise, shock, and the like are absorbed.

A motor, a reducer, and the like are connected to both a first rear-wheel driveshaft and a second rear-wheel driveshaft. Unlike in the instant case, according to the various exemplary embodiments of the present invention, the motor 140 and the reducer 130 are connected to only the first rear-wheel driveshaft 12, and power of the first rear-wheel driveshaft 12 is transferred to the second rear-wheel driveshaft 22 through the propeller shaft 100. Thus, the multi-driveshaft including the first driveshaft and the second driveshaft may be easily driven with one motor.

Furthermore, the number of components that include the motor, the reducer, and the like which are connected to the second rear-wheel driveshaft may be reduced. Thus, the reduction in the number of components may be advantageous in securing a packaging space for mounting a rear-wheel electric axle and can improve the convenience of assembling and servicing.

When only the propeller shaft 100 connecting the first rear-wheel driveshaft 12 and the second rear-wheel driveshaft 22 to each other is removed, the first rear-wheel driveshaft 12 to which the motor power is applied becomes a single driveshaft. Therefore, the electric-type axle may be provided which is sharable for the multi-driveshaft and the single driveshaft, depending on whether or not the propeller shaft 100 connects the first rear-wheel driveshaft 12 and the second rear-wheel driveshaft 22 to each other.

Figure 4A:
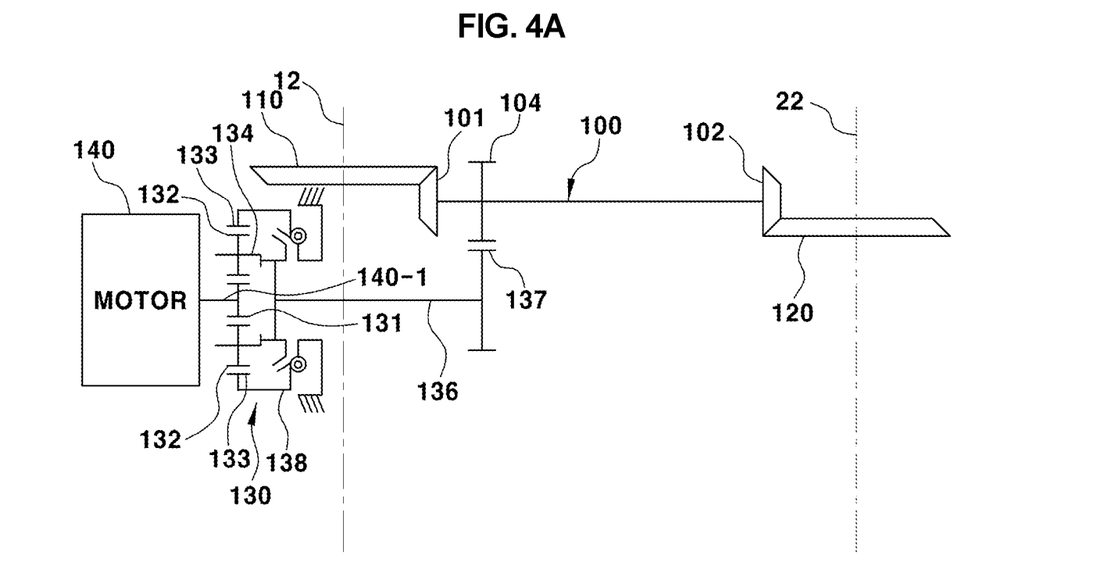
FIG. 4A is a power train view exemplarily illustrating a power transmission device for a commercial vehicle having an electric axle according to various exemplary embodiments of the present invention.
Figure 4B:
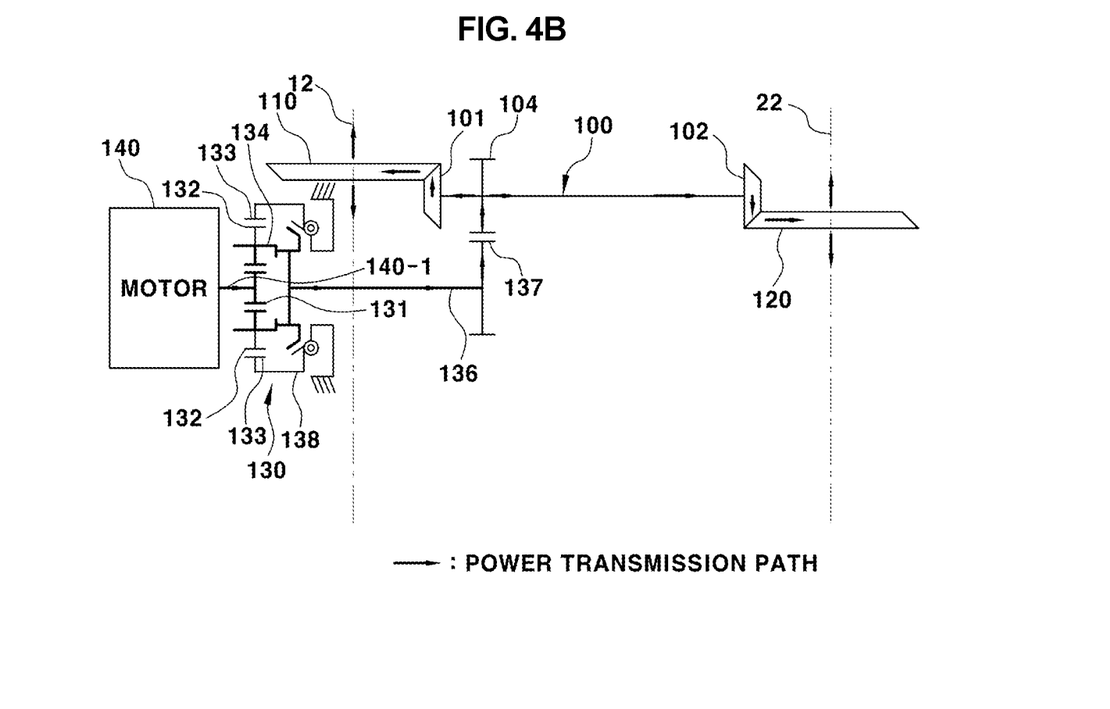
FIG. 4B is a power train view exemplarily illustrating a power transmission path of the power transmission device for the commercial vehicle having the electric axle according to the various exemplary embodiments of the present invention.

FIG. 4A is a power train view exemplarily illustrating a power transmission device for a commercial vehicle having an electric axle according to various exemplary embodiments of the present invention. FIG. 4B is a power train view exemplarily illustrating a power transmission path of the power transmission device for the commercial vehicle having the electric axle according to the various exemplary embodiments of the present invention.

Likewise, according to the various exemplary embodiments of the present invention, as illustrated in FIG. 4A and FIG. 4B, the first differential ring gear 110 is mounted in a simultaneously rotatable manner on the first rear-wheel driveshaft 12 of the commercial vehicle, such as the hydrogen fuel cell truck, and the second differential ring gear 120 is mounted in a simultaneously rotatable manner on the second rear-wheel driveshaft 22 thereof. Furthermore, the first differential ring gear 110 and the second differential ring gear 120 are connected in a power-transferable manner to each other with the propeller shaft 100.

To the present end, the first differential drive gear 101 engaged with the first differential ring gear 110 is connected to the front-end portion of the propeller shaft 100, and the second differential drive gear 102 engaged with the second differential ring gear 120 is connected to the rear end portion thereof.

According to the various exemplary embodiments of the present invention, the motor 140 and the reducer 130 are disposed in a direction perpendicular to the first rear-wheel driveshaft 12.

That is, in a state where the motor 140 and the reducer 130 are disposed in the direction perpendicular to the first rear-wheel driveshaft 12, the reducer 130 reducing and outputting the motor power is connected to the propeller shaft 100, and the output shaft 140-1 of the motor 140 is connected to the input gear of the reducer 130.

To the present end, a power distribution gear 104 is mounted on the propeller shaft 100, and a final output gear 137 connected to an output shaft of the reducer 130 is engaged with the power distribution gear 104.

The motor 140 and the reducer 130 are disposed in the direction perpendicular to the first rear-wheel driveshaft 12, and thus, the reducer 130 according to the various exemplary embodiments of the present invention may include the sun gear 131, the plurality of pinions 132, the ring gear 133, the planet carrier 134, and a second final output shaft 136. The sun gear 131 is the input gear connected to the output shaft 140-1 of the motor 140. The plurality of pinions 132 are engaged with the sun gear 131. The ring gear 133 is formed within the reducer housing 138 and is engaged with the pinion 132. The planet carrier 134 is connected coaxially to the pinion 132. The second final output shaft 136 is connected in a power-transferable manner between the planet carrier 134 and the final output gear 137.

Therefore, as illustrated in FIG. 4B, when the motor 140 is driven, the operation in which the sun gear 131 connected to the output shaft 140-1 of the motor 140 rotates, the operation in which the pinion 132 moves, while rotating, along the external circumferential surface of the sun gear 131 and the internal circumferential surface of the ring gear 133, the operation in which the planet carrier 134 connected coaxially to the pinion 132 rotates, an operation in which the second final output shaft 136 connected to the planet carrier 134 rotates, and an operation in which the final output gear 137 mounted on the second final output shaft 136 transfers, while rotating, a rotational force to the power distribution gear 104 are sequentially performed. Thus, the propeller shaft 100 on which the power distribution gear 104 is mounted rotates.

Subsequently, when the propeller shaft 100 rotates, the first differential drive gear 101 and the second differential drive gear 102 that are connected to the front-end portion thereof and the rear end portion thereof, respectively, rotate together.

At the same time, a rotational force of the first differential drive gear 101 is transferred to the first differential ring gear 110 engaged therewith, and at the same time, is transferred to the first rear-wheel driveshaft 12 on which the first differential ring gear 110 is mounted. Thus, the first rear-wheel driveshaft 12 and the front rear-wheels connected thereto rotate for traveling.

Along with this, a rotational force of the second differential drive gear 102 is transferred to the second differential ring gear 120 engaged therewith, and at the same time, is transferred to the second rear-wheel driveshaft 22 on which the second differential ring gear 120 is mounted. Thus, the second rear-wheel driveshaft 22 and the rear rear-wheels connected thereto rotate for traveling.

At the present point, the first differential ring gear 110 and the second differential ring gear 120, as illustrated in FIG. 5, are disposed in opposite directions such that the first rear-wheel driveshaft 12 and the second rear-wheel driveshaft 22 rotate in the same direction for traveling.

For example, the first differential ring gear 110 is disposed to face leftward in the direction of the width of the vehicle body, and the second differential ring gear 120 is disposed to face rightward in the direction of the width thereof. Thus, the first rear-wheel driveshaft 12 and the second rear-wheel driveshaft 22 can rotate in the same direction for traveling.

The front-end portion of the propeller shaft 100 and the first differential drive gear 101 are connected to each other with the first universal joint 103, and the rear end portion of the propeller shaft 100 and the second differential drive gear 102 are also connected to each other with the second universal joint 103, such that, when the propeller shaft 100 rotates, vibration, noise, shock, and the like are absorbed.

The motor, the reducer, and the like are connected to both the first rear-wheel driveshaft and the second rear-wheel driveshaft. Unlike in the instant case, according to the various exemplary embodiments of the present invention, the first rear-wheel driveshaft 12 and the second rear-wheel driveshaft 22 may be caused to rotate together with power of one motor 140, which is transferred to the propeller shaft 100. Thus, the multi-driveshaft including the first driveshaft and the second driveshaft may be easily driven together.

Furthermore, the number of components that include the motor, the reducer, and the like which are connected to the second rear-wheel driveshaft may be reduced. Thus, the reduction in the number of components may be advantageous in securing the packaging space for mounting the rear-wheel electric axle and can improve the convenience of assembling and servicing.

Figure 6A:
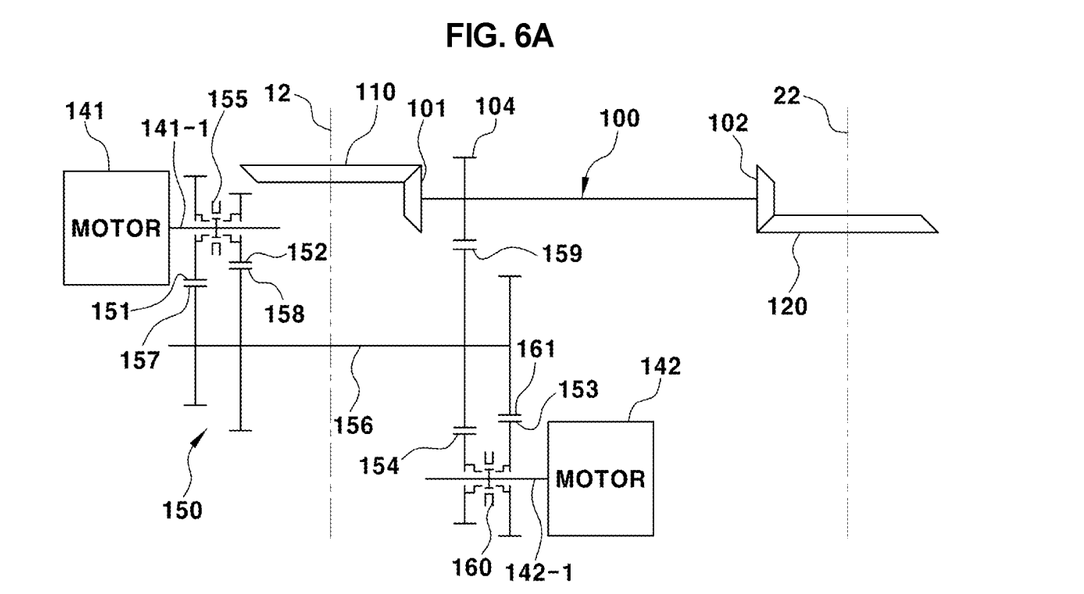
FIG. 6A is a power train view exemplarily illustrating a power transmission device for a commercial vehicle having an electric axle according to various exemplary embodiments of the present invention.
Figure 6B:
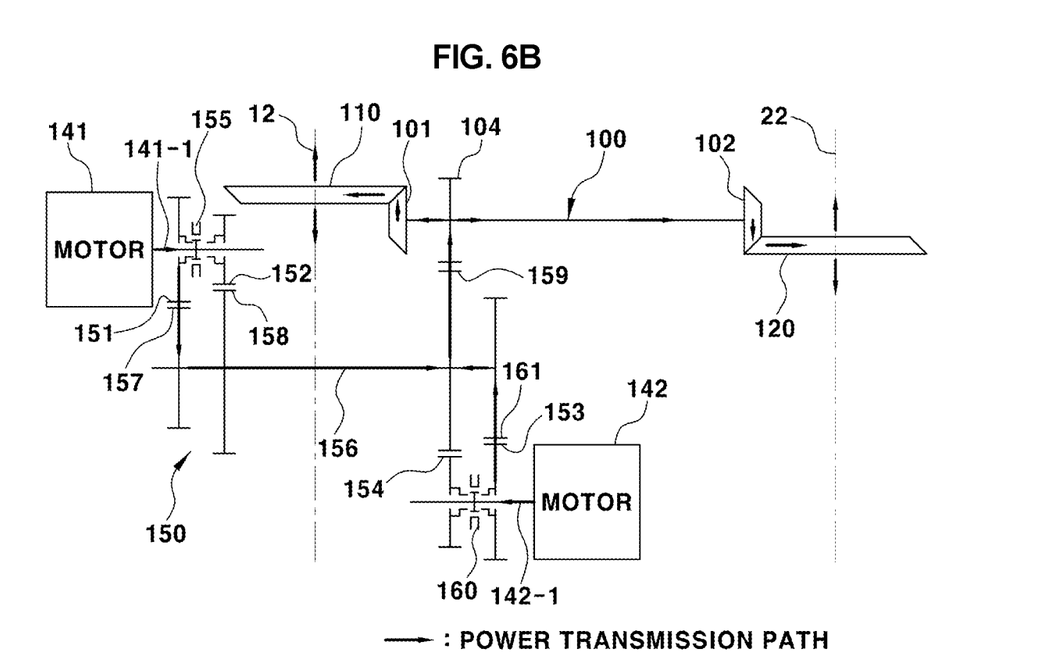
FIG. 6B is a power train view exemplarily illustrating an example of power transmission by the power transmission device for the commercial vehicle having the electric axle according to the various exemplary embodiments of the present invention.

FIG. 6A is a power train view exemplarily illustrating a power transmission device for a commercial vehicle having an electric axle according to various exemplary embodiments of the present invention. FIG. 6B is a power train view exemplarily illustrating an example of power transmission by the power transmission device for the commercial vehicle having the electric axle according to the various exemplary embodiments of the present invention.

The various exemplary embodiments of the present invention has a feature in that power of each of the first motor and obtaining the second motor is speed-changed through a transmission and in that the sum of the resulting power is obtained and is transferred to the propeller shaft.

Likewise, according to the various exemplary embodiments of the present invention, as illustrated in FIGS. 6A, the first differential ring gear 110 is mounted in a simultaneously rotatable manner on the first rear-wheel driveshaft 12 of the commercial vehicle, such as the hydrogen fuel cell truck, and the second differential ring gear 120 is mounted in a simultaneously rotatable manner on the second rear-wheel driveshaft 22 thereof. Furthermore, the first differential ring gear 110 and the second differential ring gear 120 are connected in a power-transferable manner to each other with the propeller shaft 100.

To the present end, the first differential drive gear 101 engaged with the first differential ring gear 110 is connected to the front-end portion of the propeller shaft 100, and the second differential drive gear 102 engaged with the second differential ring gear 120 is connected to the rear end portion thereof.

To the present end, the power distribution gear 104 is mounted on the propeller shaft 100, and a final output gear 159 of a transmission 150 is engaged with the power distribution gear 104.

Furthermore, a first motor 141 and a second motor 142 are connected to the input side of the transmission 150 such that outputs drive force simultaneously or selectively.

To the present end, to speed-change an output of the first motor 141, the transmission 150 includes a first speed-change gear 151 and a second speed-change gear 152, a first clutch 155, a power transmission shaft 156, a first intermediate gear 157, and a second intermediate gear 158. The first speed-change gear 151 and the second speed-change gear 152 are mounted side by side on an output shaft 141-1 of the first motor 141 in a rotatable manner. The first clutch 155 is disposed between the first speed-change gear 151 and the second speed-change gear 152 and connects the first speed-change gear 151 with the output shaft 141-1 of the first motor 141 or connects the second speed-change gear 152 with the output shaft 141-1 of the first motor 141. The power transmission shaft 156 is connected coaxially to the final output gear 159. The first intermediate gear 157 is mounted on the power transmission shaft 156 and is engaged with the first speed-change gear 151. The second intermediate gear 158 is mounted on the power transmission shaft 156 and is engaged with the second speed-change gear 152.

Furthermore, to speed-change an output of the second motor 142, the transmission 150 is configured to further include a third speed-change gear 153 and a fourth speed-change gear 154, a second clutch 160, and a third intermediate gear 161. The third speed-change gear 153 and the fourth speed-change gear 154 are mounted side by side on an output shaft 142-1 of the second motor 142 in a rotatable manner. The second clutch 160 is disposed between the third speed-change gear 153 and the fourth speed-change gear 154 and connects the third speed-change gear 153 with the output shaft 142-1 of the second motor 142 or connects the fourth speed-change gear 154 with the output shaft 142-1 of the second motor 142. The third intermediate gear 161 is mounted on the power transmission shaft 156 and is engaged with the third speed-change gear 153. In the transmission 150, the fourth speed-change gear 154 is engaged directly with the final output gear 159.

At the present point, the first differential ring gear 110 and the second differential ring gear 120, as illustrated in FIG. 5, are disposed in opposite directions such that the first rear-wheel driveshaft 12 and the second rear-wheel driveshaft 22 rotate in the same direction for traveling.

For example, the first differential ring gear 110 is disposed to face leftward in the direction of the width of the vehicle body, and the second differential ring gear 120 is disposed to face rightward in the direction of the width thereof. Thus, the first rear-wheel driveshaft 12 and the second rear-wheel driveshaft 22 can rotate in the same direction for traveling.

The front-end portion of the propeller shaft 100 and the first differential drive gear 101 are connected to each other with the first universal joint 103, and the rear end portion of the propeller shaft 100 and the second differential drive gear 102 are also connected to each other with the second universal joint 103, such that, when the propeller shaft 100 rotates, vibration, noise, shock, and the like are absorbed.

At the present point, an example where the output of the first motor 141 is transferred to the propeller shaft 100 through the first speed-change gear 151, and at the same time, the output of the second motor 142 is transferred to the propeller shaft 100 through the third speed-change gear 153 is described to help understand an operational flow for the power transmission device according to the various exemplary embodiments of the present invention.

FIG. 6B is a power train view exemplarily illustrating an example where the power of each of the first motor 141 and the second motor 142 of the power transmission device according to the various exemplary embodiments of the present invention is transferred to the propeller shaft 100 through the transmission 150.

When the first clutch 155 performs an operation of connecting the first speed-change gear 151 with the output shaft 141-1 of the first motor 141 and then the first motor 141 is driven, rotational power of the first motor 11 is speed-changed through the first speed-change gear 151 and the first intermediate gear 157 and is transferred to the power transmission shaft 156. Thereafter, the rotation power of the first motor 11 is transferred from the final output gear 159, which is connected coaxially to the power transmission shaft 156, to the power distribution gear 104 of the propeller shaft 100.

Subsequently, the propeller shaft 100, on which the power distribution gear 104 is mounted, rotates, and thus, the first differential drive gear 101 and the second differential drive gear 102, which are connected to the front-end portion thereof and the rear end portion thereof, respectively, rotate together.

Subsequently, the rotational force of the first differential drive gear 101 is transferred to the first differential ring gear 110 engaged therewith, and at the same time, is transferred to the first rear-wheel driveshaft 12 on which the first differential ring gear 110 is mounted. Thus, the first rear-wheel driveshaft 12 and the front rear-wheels connected thereto rotate for traveling.

Along with this, the rotational force of the second differential drive gear 102 is transferred to the second differential ring gear 120 engaged therewith, and at the same time, is transferred to the second rear-wheel driveshaft 22 on which the second differential ring gear 120 is mounted. Thus, the second rear-wheel driveshaft 22 and the rear rear-wheels connected thereto rotate for traveling.

Of course, in a case where the first clutch 155 performs an operation of connecting the second speed-change gear 152 with the output shaft 141-1 of the first motor 141, power corresponding to a gear ratio of the second speed-change gear 152 may be transferred to the power distribution gear 104 of the propeller shaft 100 through the final output gear 159.

In the present manner, the power of the first motor 141 may be distributed to the propeller shaft 100 through the transmission 150, and at the same time, the power of the second motor 142 may be distributed to the propeller shaft 100 through the transmission 150.

To the present end, when the second clutch 160 performs an operation of connecting the third speed-change gear 153 with the output shaft 142-1 of the second motor 142 and then the second motor 142 is driven, rotational power of the second motor 142 is speed-changed through the third speed-change gear 153 and the third intermediate gear 161 and is transferred to the power transmission shaft 156. Thereafter, the rotational power of the second motor 142 is transferred from the final output gear 159, which is connected coaxially to the power transmission shaft 156, to the power distribution gear 104 of the propeller shaft 100.

Subsequently, the propeller shaft 100, on which the power distribution gear 104 is mounted, rotates, and thus, the first differential drive gear 101 and the second differential drive gear 102, which are connected to the front-end portion thereof and the rear end portion thereof, respectively, rotate together.

Subsequently, the rotational force of the first differential drive gear 101 is transferred to the first differential ring gear 110 engaged therewith, and at the same time, is transferred to the first rear-wheel driveshaft 12 on which the first differential ring gear 110 is mounted. Thus, the first rear-wheel driveshaft 12 and the front rear-wheels connected thereto rotate for traveling.

Along with this, the rotational force of the second differential drive gear 102 is transferred to the second differential ring gear 120 engaged therewith, and at the same time, is transferred to the second rear-wheel driveshaft 22 on which the second differential ring gear 120 is mounted. Thus, the second rear-wheel driveshaft 22 and the rear rear-wheels connected thereto rotate for traveling.

Of course, in a case where the second clutch 160 performs an operation of connecting the fourth speed-change gear 154 with the output shaft 142-1 of the second motor 142, power corresponding to a gear ratio of the fourth speed-change gear 154 may be transferred to the power distribution gear 104 of the propeller shaft 100 through the final output gear 159.

According to the various exemplary embodiments of the present invention, the transmission configured for performing multi-step speed-change, which is at least two- or more-step speed-change, may be employed for the rear-wheel electric axle, and thus performance in traveling may be improved.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmitting apparatus for a vehicle having an electric axle, the power transmitting apparatus comprising:
    a first differential ring gear fixedly mounted on a first rear-wheel driveshaft;
    a second differential ring gear mounted on a second rear-wheel driveshaft;
    a propeller shaft, a front-end portion of which is fixedly connected to a first differential drive gear engaged with the first differential ring gear and a rear end portion of which is fixedly connected to a second differential drive gear engaged with the second differential ring gear;
    a reducer connected to the first differential ring gear or the propeller shaft; and
    a motor, an output shaft of which is fixedly connected to an input gear of the reducer,
    wherein in a case where the output shaft of the motor and an rotation axis of the reducer are disposed perpendicular to the first rear-wheel driveshaft, a power distribution gear is fixedly mounted on the propeller shaft, and a final output gear fixedly connected to an output shaft of the reducer is engaged with the power distribution gear.

2. The power transmitting apparatus of claim 1, wherein the reducer includes:
    a sun gear which is the input gear of the reducer and connected to the output shaft of the motor;
    a pinion gear-engaged with the sun gear;
    a ring gear fixedly connected to a housing of the reducer and gear-engaged with the pinion;
    a planet carrier connected coaxially to the pinion; and
    a second final output shaft connecting the planet carrier to the final output gear.

* * * * *